(12) United States Patent
Kolpasky et al.

(10) Patent No.: US 7,301,442 B2
(45) Date of Patent: Nov. 27, 2007

(54) MULTI-FUNCTIONAL FOB

(75) Inventors: Kevin G. Kolpasky, Sterling Heights, MI (US); Adrian B. Chernoff, Troy, MI (US); James T. Embach, Rochester Hills, MI (US); Christopher E. Borroni-Bird, Oakland Township, MI (US)

(73) Assignee: General Motors Corporation, Detroit, MI (US)

( * ) Notice: Subject to any disclaimer, the term of this patent is extended or adjusted under 35 U.S.C. 154(b) by 165 days.

(21) Appl. No.: 11/059,877

(22) Filed: Feb. 17, 2005

(65) Prior Publication Data

US 2006/0049922 A1 Mar. 9, 2006

Related U.S. Application Data

(60) Provisional application No. 60/607,545, filed on Sep. 7, 2004.

(51) Int. Cl.
*B60R 25/10* (2006.01)

(52) U.S. Cl. .................. 340/426.13; 340/426.35; 340/426.36; 307/10.2; 307/10.5; 348/61

(58) Field of Classification Search ........... 340/426.13, 340/426.35, 426.36, 426.14

See application file for complete search history.

(56) References Cited

U.S. PATENT DOCUMENTS

| | | | | |
|---|---|---|---|---|
| 6,308,083 | B2 * | 10/2001 | King ...................... | 455/556.1 |
| 6,943,666 | B2 * | 9/2005 | Mooney et al. ........... | 340/10.5 |
| 7,042,342 | B2 * | 5/2006 | Luo et al. ............... | 340/426.17 |
| 2002/0067245 | A1 * | 6/2002 | Campbell et al. .......... | 340/5.64 |
| 2003/0071791 | A1 * | 4/2003 | Hanson ..................... | 345/169 |
| 2003/0231550 | A1 * | 12/2003 | Macfarlane ................ | 367/198 |
| 2005/0031100 | A1 * | 2/2005 | Iggulden et al. ......... | 379/102.03 |

* cited by examiner

*Primary Examiner*—Donnie L. Crosland (57) ABSTRACT

A multi-functional fob provides at least one of the features selected from a programmable lock/unlock button; a voice activated button; an ice-scraper; a credit card strip; and a rechargeable interface. One or a combination of the features may be integrated into a single fob. A fob-retaining device may be provided. Each fob function may be integrated into an electronic device such as a PDA, a cellular phone, a two-way radio, a wristwatch, a voice recorder, an audio player, a video player, or a multi-communication signal fob repeater. Optionally, the fob may have a compass and a timer. Additionally, a multi-functional fob communication system is provided to provide remote communications between a receiver in a fob-activated device and a remote electronic fob device.

34 Claims, 5 Drawing Sheets

MULTI-FUNCTIONAL FOB

CROSS-REFERENCE TO RELATED APPLICATIONS

This application claims the benefit of U.S. Provisional Application Ser. No. 60/607,545 filed on Sep. 7, 2004.

FIELD OF THE INVENTION

The present invention relates generally to a remote-control keyless access control device, and more particularly to a keyless entry fob having multiple functions for bi-directional communication within a multi-function fob system.

BACKGROUND OF THE INVENTION

Typically a remote keyless entry system provides a portable fob that is in electromagnetic communication with a transmitter or receiver in an automobile. A conventional fob requires that specific buttons disposed on the fob be pressed to remotely command the vehicle to perform basic commands such as locking or unlocking a rear, front, driver or passenger doors and a lift gate or trunk. The command signals communicated from the conventional fob to a motor vehicle upon pressing a specified button generally cannot be transmitted from a distance greater than 300 feet from the motor vehicle.

It is desirable to provide a multi-function fob capable of providing additional hardware and software features that extends beyond the basic functionality provided by a conventional fob.

Additionally, it is desirable to provide a multi-function fob that may be integrated into one or into a plurality of electronic devices such as a personal digital assistant, a two-way radio, a cellular phone, a wristwatch, a voice recorder, an audio player, a video player, and a multi-communication fob repeater.

Additionally, it is desirable to provide a multi-function fob communication system to remotely communicate between a multi-functional fob and other electronic devices.

SUMMARY OF THE INVENTION

The present invention describes a multi-functional fob that is capable of performing one or a plurality of functions to selectively activate or deactivate a fob-activated device or a portion of a fob-activated device. The fob-activated device may be any electrical as well as any electromechanical device or combination of electromechanical devices capable of being activated by the multifunctional fob.

The fob is equipped with a user-defined programmable function, i.e. a function that provides a user with the ability to selectively activate a setting of series of settings corresponding to one or more fob-activatable devices in accordance with a user's preference. The user-defined programmable function provides a user interface that allows for user-customization of a user's preferences. For example, the interface associated with the programmable function provided within the fob may be, but is not limited to an interactive touch screen, or a button disposed on the fob, wherein both the optional interactive touch screen and the button disposed on the fob may be operated by a mechanical, electrical, or audio signal, such as a voice command from a user.

Such a user-defined programmable function may be used in a preferred embodiment where the fob-activated device is a motor vehicle. Thus, the user-defined programmable function may be a button provided that can remotely select activation of at least one or a combination of operations or settings within a vehicle. For instance, with the stroke of one button, a user can perform at least one or more of the following operations: locking or unlocking at least one of a driver door, and any non-driver doors; opening or closing at least one of a driver's side sliding door, a passenger side sliding door, and a sunroof; adjusting at least one of powered seats, temperature settings for heated seats and vehicle temperatures for different zones in the car; selecting desired radio channels, and selecting presets for radio channels.

The fob may be further equipped with a voice activated function that uses voice-activation technology to remotely activate a fob-activated device upon receiving an audio signal from a user. For example, when approaching the car with an armload of groceries, a user could say "open lift gate" and the fob would send appropriate signal to the vehicle.

The present invention may further provide a confirmation function that confirms completion of activation or deactivation of a fob-activated device. The signal confirmation may be any suitable signal, such as an audio, a vibrating, or a visual signal, that communicates confirmation to a fob user.

The multi-functional fob is also equipped with an integrated ice scraper, i.e. an edge such as a blade used for clearing ice off the windshield, rather than using a credit card when in a bind. Alternatively, the ice scraper may be connected to the fob using any conventional connecting device such as a hinge.

The fob is further equipped with a credit card strip, i.e. a magnetic strip that flips out from inside the fob body that can be programmed with the user's credit card information. This can be used to pay for items such as gas or groceries.

The fob can communicate with a fob-activated device or with another fob. Additionally, the fob may be separable into a first piece and a second piece, wherein the first piece may have a transmitter portion for transmitting fob signals to the second piece or to at least one of the second piece of a separable fob, a fob activated device, and another fob. The second piece may have a receiver that can communicate with the first piece having the transmitter portion. Preferably, the fob easily disconnects from a fob-retaining device such as a key chain. The passenger of the automobile can easily disconnect the fob from the fob retaining device or alternatively each piece of the separable fob can be releasably detached from the other piece and the fob or fob piece can be taken into a store to then communicate with a driver who may have the mating piece of the severable fob, or may have another fob or alternatively may have an electronic device capable of communicating with the passenger fob to let the driver know when to drive back to the door to pick up the passenger.

The fob is equipped with a rechargeable battery, which can be recharged by either an AC, a DC, or an inductive current via a rechargeable interface. The t rechargeable interface may be flip-out prongs or contact points that operate to charge the battery when in electrical communication with the battery. Alternatively, the rechargeable interface may be a USB drive that is in communication with a USB port for recharging the battery.

The fob functions may be integrated into an electronic device such as a PDA, a cellular phone, a two-way radio, a wristwatch, a voice recorder, or a multi-communication signal fob repeater. The electronic device may further include any type of audio player, such as a music player capable of recording, storing, and playing MP3 files; and a video player that may be integrated alone or in combination with the audio player. Preferably, the combination audio player and video player cooperate to provide video images, text, and audio text support to a user.

The fob may further be equipped with a display, screen that provides an owner's manual overview that may be selectively accessed by outputting at least one or a combination of video images, text, and audio text support to a user. A user may use the display to scan through an owner's manual document listing only the most frequently referenced items.

The fob may also equipped with a digital or analog camera or video camera that may be used for photographing the area around where the automobile is parked and these images may be displayed on an integrated screen, or alternatively may be sent to another electronic device.

The fob may further include a two-way radio that communicates with another two-way radio device.

The fob functions can be integrated into a wristwatch such that the fob does not need to be carried separately in a pocket or purse.

Additionally, in a preferred embodiment, the wristwatch may be integrated with a two-way radio. The integrated two-way radio wristwatch may be a child's watch that can communicate with another two-way radio device. Thus, a parent using the multi-functional fob can communicate with their child in the event that they get separated in a store, for example.

Also, in another preferred embodiment, the features of a voice recorder may be integrated with a fob having conventional fob features. Alternatively, a fob may have voice recorder features incorporated further with another electronic device such as a PDA, a two-way radio, a cell phone, or a wristwatch.

Additionally, the fob functions may also be integrated into a timer, or a compass, wherein the timer and compass may be further integrated alone or in combination with any of the other electronic devices.

A multi-function fob communication system and method of use is also provided.

DETAILED DESCRIPTION OF THE PREFERRED AND ALTERNATE EMBODIMENTS

The present invention is generally directed to a multi-functional fob that operates to activate a fob-controlled device.

More particularly, a fob-activated device may be any electromechanical device of combination of electromechanical devices capable of being activated remotely by a fob.

Examples of a fob-activated device may include a motor vehicle such as an automobile. Alternatively, electrical devices located in a user's home or office may be activated by a multifunctional fob of the present invention. An example of such electrical devices may be, but is not limited to alarm systems, appliances, and electronically operated doors such as garage or security doors. The invention describes a multi-functional fob that is capable of performing at least one or a plurality of functions to selectively activate or deactivate a fob-activated device.

A multifunctional fob 100 as defined herein is a device capable of performing at least one or a plurality of functions to selectively activate or deactivate a fob-activated device or a portion of a fob-activated device.

The multifunctional fob may trigger operation of the fob-activated device by use of mechanical, electrical, or digital functions, such as, but not limited to software provided within the fob, wireless transmission of data that can be uploaded or downloaded to the fob, and transmission of an encoded signal from the fob to the fob-activated device or vice versa.

For example, the fob may have data encoded into an embedded bar code, a magnetic strip, or an ID wafer embedded in plastic that receives a signal for identification. The fob having encoded data communicates with a fob-activated device to operate the fob-activated device upon receiving a signal such as an electronic pulse or a scan of the endoded data. Additionally, the fob-activated device may provide a computer chip that can be selectively activated by a combination of mechanical and/or electrical signals from the multifunctional fob of the present invention.

The fob may also have a USB port for transferring data back and forth between the fob and another electronic device. Additionally, the USB port may be in communication with a USB drive for storing data that is either integrated with the fob or that is in electrical communication with the fob. Thus, the fob can transfer and access data from the USB drive through the USB port.

Several preferred embodiments of a multifunctional fob are contemplated. While it is preferred that at least one of the features discussed herein are integrated into the fob 100, it is contemplated that more than one or a plurality of the features may be integrated into the fob 100.

Figure 1:
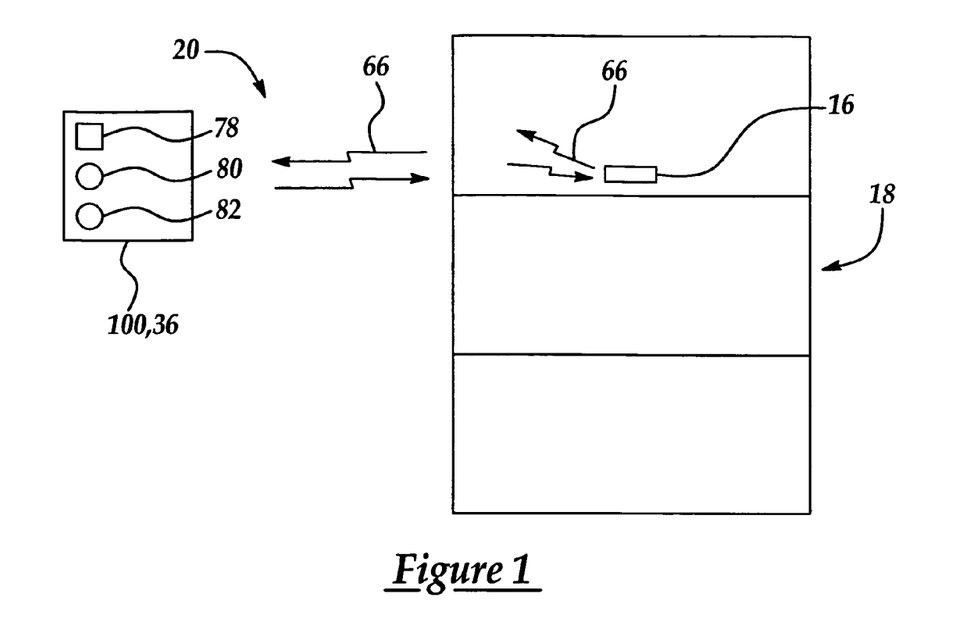
FIG. 1 illustrates a fob in communication with a communication receiver.

Referring now to the drawings, FIG. 1 illustrates a fob communication system 20 that provides communication between a fob and a fob-activated device. The signal between the receiver and transmitter should be encoded with encrypted data to prevent unauthorized access by a user of a fob to a vehicle that is not associated with a specified fob.

It is further contemplated that the fob of the present invention be equipped with a user identification and authentication feature to secure access to a fob-activated device. The fob of the present invention may use biometric data to perform identification and authentication functions that operate to differentiate users of the fob. For example, a biological scan such as an iris scan of a user's eye or a fingerprint identification may be used to both identify and authenticate a user of the fob to prevent unauthorized use by another.

In one preferred embodiment, the fob 100 controls an automobile and the fob 100 is equipped with a user-defined programmable function. In another preferred embodiment, the fob 100 provides a voice activated function operated through use of voice activation technology. Additionally, a confirmation function is also provided to confirm activation of deactivation of a fob-operated device. Alternatively, an optional ice-scraper or a credit card strip may be integrated into the fob 100. In another preferred embodiment, a rechargeable interface is provided to allow for recharging a rechargeable fob battery.

Preferably, the fob 100 is releasably engageable with a fob-retaining device such as keys on a key ring. The fob 100 preferably has at least one of the features selected from a user-defined programmable function, a voice activated function, an ice-scraper, a credit card strip, and a rechargeable interface In one preferred embodiment, a multi-functional fob 100 provides a user-defined programmable function, i.e. a function that provides a user with the ability to selectively activate at least one setting or a series of settings corresponding to one or more fob-activatable devices in accordance with a user's preference. The user-defined programmable function allows for more than one key fob to be programmed separately, wherein each of the key fobs can activate the same fob-activatable device in accordance with a respective user's preference. The user-defined programmable function allows for user-customization of a user's preferences such that a user interacts with an interface associated with the programmable function provided within the fob. For example, the interface associated with the programmable function provided within the fob may be, but is not limited to an interactive touch screen, or a button 78 disposed on the fob, wherein both the interactive touch screen and the button disposed on the fob may be operated by a mechanical, electrical, or audio signal, such as a voice command from a user.

Such a user-defined programmable function may be used in a preferred embodiment where the fob-activated device is a motor vehicle. Thus, the user-defined programmable function may be a button provided that can remotely select activation of at least one or a combination of operations or settings within a vehicle. For instance, with the stroke of one button 78, a user can perform at least one or more of the following operations: locking or unlocking at least one of a driver door, and any non-driver doors; opening or closing at least one of a driver's side sliding door, a passenger side sliding door, and a sunroof; adjusting at least one of powered seats, temperature settings for heated seats and vehicle temperatures for different zones in the car; selecting desired radio channels, and selecting presets for radio channels. Thus, a driver's fob may be programmed differently than a passenger's fob to allow for example, each respective fob user to selectively activate desired seat settings such as heat and position settings to be set according to each user's preference, before each user sits in the motor vehicle.

In an alternative embodiment, the fob 100 may be further equipped with a voice activated function that uses voice-activation technology to remotely activate a fob-activated device upon receiving an audio signal from a user. The voice-activated function may be in the form of voice activatable buttons 80, 82, that operate to receive an audio signal command from a user and then transmit the audio signal command to the fob-activated device. For example, when approaching a car with an armload of groceries, a user could activate the voice activatable buttons 80, 82 by using a voice command, such as saying "open lift gate" and the fob having the voice activated function would send an appropriate signal to the vehicle. Thus, the voice activatable buttons 80, 82 trigger transmission of a signal from the fob to a vehicle by using a voice command.

The present invention may further provide a confirmation function, wherein the confirmation function may be a signal confirmation that confirms completion of activation or deactivation of a fob-activated device. The signal confirmation may be any suitable signal that communicates confirmation to a fob user such as a signal comprising that may be one or more of the following an audio signal, a vibrating signal or a visual signal.

Figure 13A:
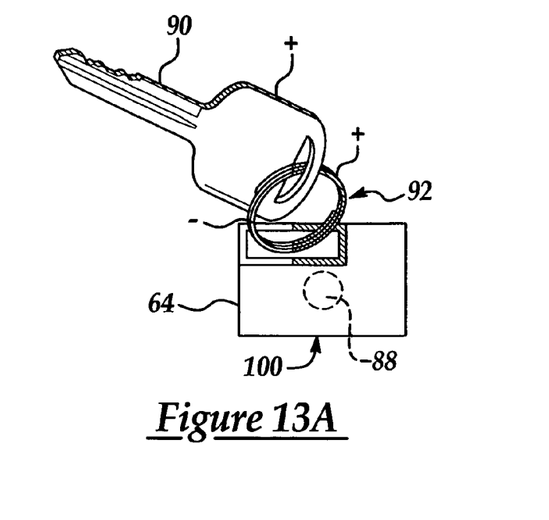
FIG. 13A illustrates a fob in communication with a direct current rechargeable interface.
Figure 13B:
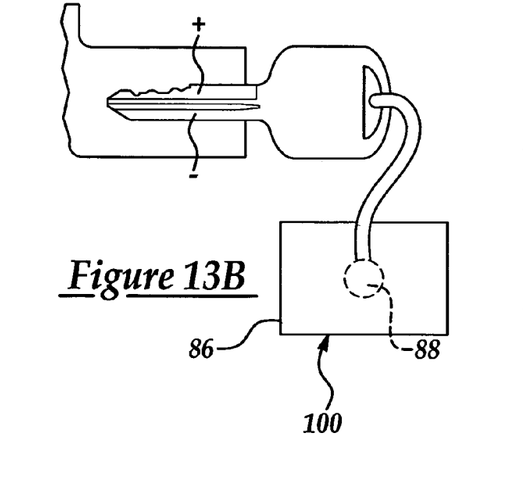
FIG. 13B illustrates a fob in communication with an inductive current rechargeable interface.

As shown in FIGS. 13A-B, the fob 100 is preferably equipped with a rechargeable battery 88 shown in phantom in FIGS. 13A-B, which can be recharged by either an AC, a DC, or an inductive current via a rechargeable interface 64, 86.

The rechargeable interface may be flip-out prongs or contact points that operate to charge the rechargeable battery when in electrical communication with the rechargeable battery. The rechargeable interface may be located wherever the fob is stowed. For example, the fob interface may be an ignition key that is in electrical communication with the fob and operates to charge the battery when the ignition key is in an ignition position.

In a preferred embodiment, the rechargeable interface 64, 86 may be used to charge the fob using contacts points on an ignition key, or on an auxiliary charger.

In one embodiment of the rechargeable interface 64, as shown in FIG. 13A the fob 100 may be electrically connected via hardwiring to an ignition key 90 having a positive terminal (+) and a negative terminal (−), such that when the ignition key 90 turns on the vehicle or operates the vehicle in the accessory mode, Direct Current is electrically communicated to the fob battery to charge the fob 100.

In an alternative embodiment, an auxiliary charger well known in the electrical charging arts is provided to releasably engage a portion of the fob 100 to recharge the rechargeable battery. Preferably, flip-out prongs on either the charger or the fob 100 mates with a complementary portion of the charger or the fob 100, respectively.

Alternatively, the auxiliary charger may be a docking station, such as a USB docking station that electrically connects and charges the fob through use of a USB port and a cord connector.

The auxiliary charger may provide a DC signal to charge the fob 100 by having a first end that is complementary in shape to a portion of the fob 100 to mate with the complementary portion of the fob 100 and a second end that plugs into a cigarette lighter within the vehicle. Alternatively, the DC auxiliary charger may be located on the steering column of the vehicle that is complementary in shape to a portion of the fob to provide a DC charge to the fob 100.

Alternatively, an AC auxiliary charger may provide an AC signal to charge the fob 100, wherein the auxiliary charger has a first end that is complementary in shape to a portion of the fob 100 to mate with the complementary portion of the fob 100 and a second end that plugs into an electrical outlet or an AC power supply.

In another preferred embodiment, an inductive auxiliary charger may be located on a steering column of a motor vehicle or in a location near the steering column of the vehicle for inductive coupling wherein the fob may be releasably engageable with an associated key ring during the charging process.

Alternatively, as shown in FIG. 13B, an inductive charge may electrically communicated from a researchable interface 86 in the form of an inductive charger to the fob 100. The inductive charger 86 may be a key ring 92 integrally formed with an ignition key 90 that is adapted to inductively couple with the fob 100.

Figure 9:
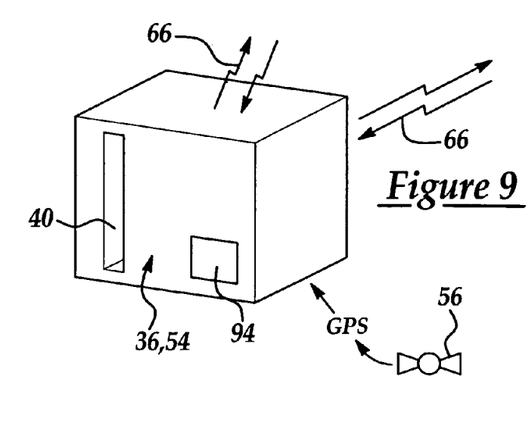
FIG. 9 illustrates a fob multi-communication signal repeater with rechargeable interface.

In an alternative embodiment, shown in FIG. 9, a multi-communication signal fob repeater may provide a rechargeable interface 94 capable of recharging a fob battery associated with a fob or a fob chip.

Preferably, the fob 100 releasably engages a key ring or at least one ignition key via a quick-disconnect as will be appreciated by a skilled artisan in the mechanical arts. The quick-disconnect operates to removably detach the multi-functional fob from a fob-retaining device such as a key ring. Thus, a fob user, such as a passenger can easily disconnect the fob from the key ring or keys, take the fob into a store and later communicate with a driver remaining in the vehicle to drive back to the store to pick up the passenger.

Figure 3:
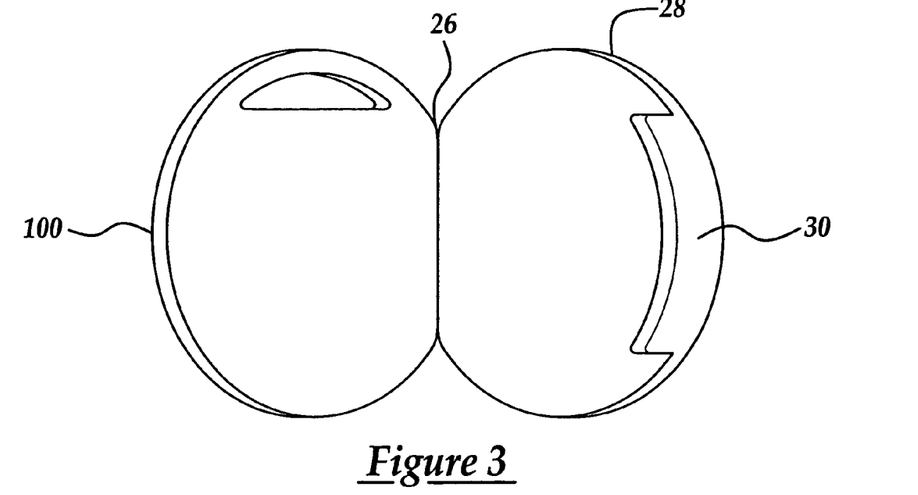
FIG. 3 illustrates a fob equipped with a foldout ice scraper.

FIG. 3 illustrates another embodiment of the fob 100 that has an optional integrated ice scraper 28 for use in cold weather climate. The integrated ice scraper 28 in a preferred embodiment is preferably hingeably connected to the fob 100 by a hinge 26. Thus, the integrated ice scraper 28 has an edge or blade 30 that swings out from inside the fob used for clearing ice or snow as needed off a windshield, rather than using a credit card when in a bind.

However, in an alternative embodiment, the fob 100 may have a slot that slidably engages the ice scraper 28. Other conventional means of connecting the ice scraper to the fob 100 are contemplated.

Figures 4A, 4B:
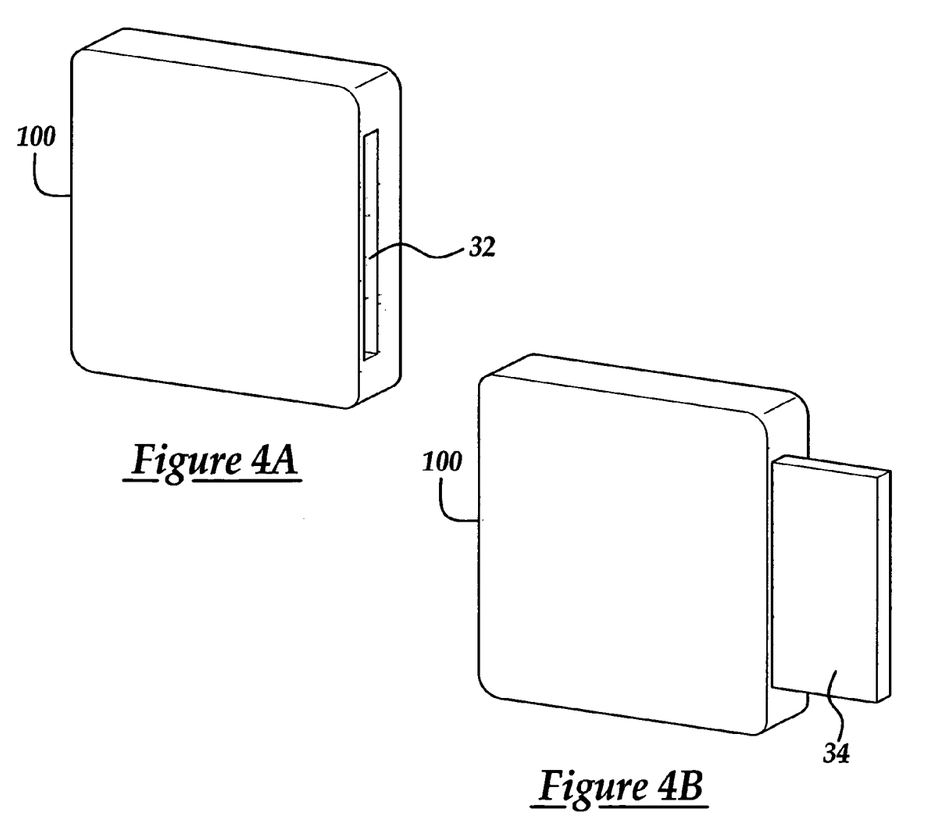
FIG. 4A illustrates a fob equipped with a slot for receiving a foldout credit card strip.
FIG. 4B illustrates a fob equipped with a foldout credit card strip.

FIGS. 4A-B illustrate another optional feature of a foldout or retractable credit card strip 34 connected to the fob 100, thus eliminating the need for carrying a separate credit card. In a preferred embodiment, the credit card strip 34 is a magnetic strip that optionally folds or slides out from inside an interior body portion of the fob 100 that can be programmed with a user's credit card information. Thus, the retractable credit card strip 34 is preferably programmable. The credit card strip 34 can be used to pay for items such as gas or groceries.

As shown in FIGS. 4A-B, the foldout or slide-out credit card strip is retractable and is preferably in slidable communication with a slot 32, wherein the slot 32 is complementary in shape to the credit card strip 34 to receive the credit card strip 34.

Alternatively, the credit card strip 34 may be hingeably or removably attached to the fob 100.

As discussed herein, the fob 100 has at least one of or a combination of the features selected from a user-defined programmable unlock function, a voice activated function, a confirmation function, an ice-scraper, a credit card strip, and a rechargeable interface. Also, the fob may have a user-identification function and a fob-retaining device.

The fob 100 having the unique features described herein may be optionally be integrated into an electronic device 36, wherein the electronic device is preferably selected from at least one of a PDA, a two-way radio, a cellular phone, a wristwatch, a voice recorder, and a multi-communication signal fob repeater. The electronic device 36 may further include any type of audio player, such as a music player capable of recording, storing, and playing MP3 files; and a video player that may be integrated alone or in combination with the audio player. Additionally, the fob functions may also be integrated into a timer, or a compass (not shown), wherein the timer or compass may be further integrated in any combination with any of the other electronic devices. Preferably, the timer includes an alarm.

Preferably, the electronic device 36 has a processing unit capable of performing processing functions, and a storage device capable of storing fob related data, wherein the storage device may be, but is not limited to, at least one programmable memory cell or an array of programmable memory cells. Alternatively, the storage device may be a USB drive in electrical communication with a USB port.

Figure 6:
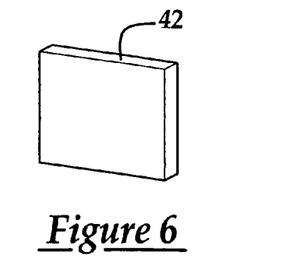
FIG. 6 illustrates a fob chip to be inserted into a fob docking port of a PDA or other computing device.

As shown in FIG. 6, an alternative embodiment of the fob 100 provides a fob chip 42 that may be integrally formed with or releasably engageable with a docking port of the electronic device 36, wherein the docking port may be a USB port.

FIGS. 5, 7, 8, 9, 11, and 12 illustrate a fob chip 42 that is integrated within an electronic device 36, wherein the fob chip 42 may be in bi-directional electrical communication with the electronic device 36 via an optional docking port 40 when mated with the docking port 40 for downloading from or uploading to the fob chip 42. The electronic device 36 may also have a storage device having fob functions incorporated therein for activating and deactivating a fob-activated device.

Preferably, the fob chip 42 is a programmable chip having code or data that incorporates fob functions therein. The fob chip 42 may be integrally formed with the electronic device 36 via hard wiring, or software. For example, the fob chip 40 may be physically built into a circuit board to releasably engage the electronic device 36. Optionally, the fob chip 42 is removable and can remotely communicate with the electronic device 36.

The fob chip 42 allows for transfer of data to be performed remotely between the electronic device and a fob-activated device. Preferably, the data transfer is performed using communication means that may include blue tooth, RF, infrared, ultrasonic, GPS, cellular, radio, or other conventional remote communication means.

FIG. 6 illustrates the removable fob chip or card 42 that may releasably engage the optional fob docking port 40 of the electronic device 36 to bi-directionally electronically communicate with the docking port 40.

Alternatively, the fob chip 42 may be in the form of a programmable memory stick or may have a chip associated with memory that may be in releasable engagement with and share data with the electronic device via the docking port 40.

Figure 5:
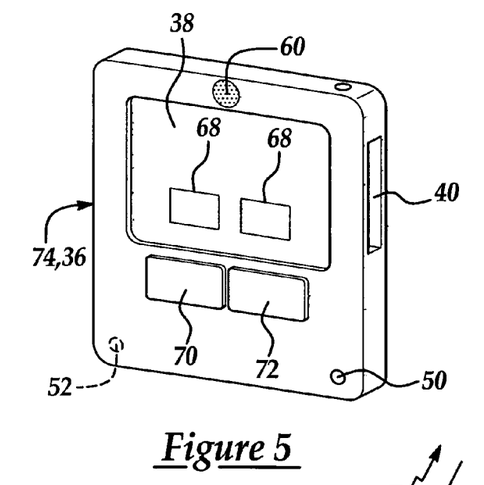
FIG. 5 illustrates a PDA or other computing device with a fob docking port.
Figure 7:
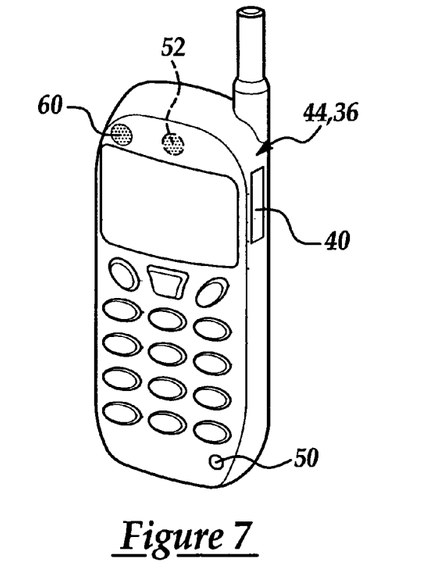
FIG. 7 illustrates a cellular phone having fob docking port and communication means to communicate with a fob-activated device.
Figure 8:
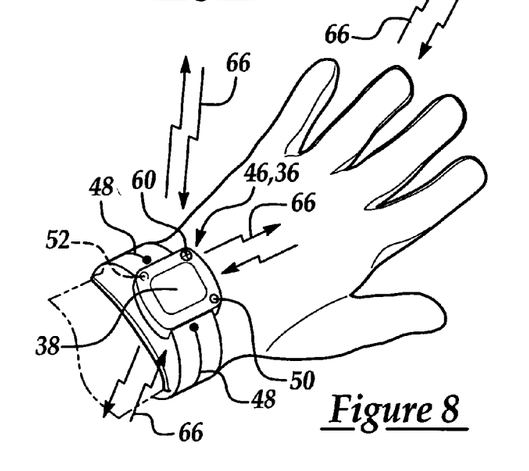
FIG. 8 illustrates a fob integrated into a wristwatch.
Figure 12:
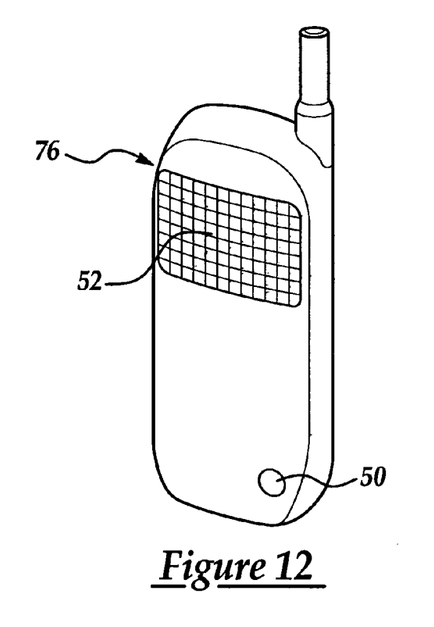
FIG. 12 illustrates a two-way radio integrated with a fob having communication means for communicating with a transceiver.
Figure 14:
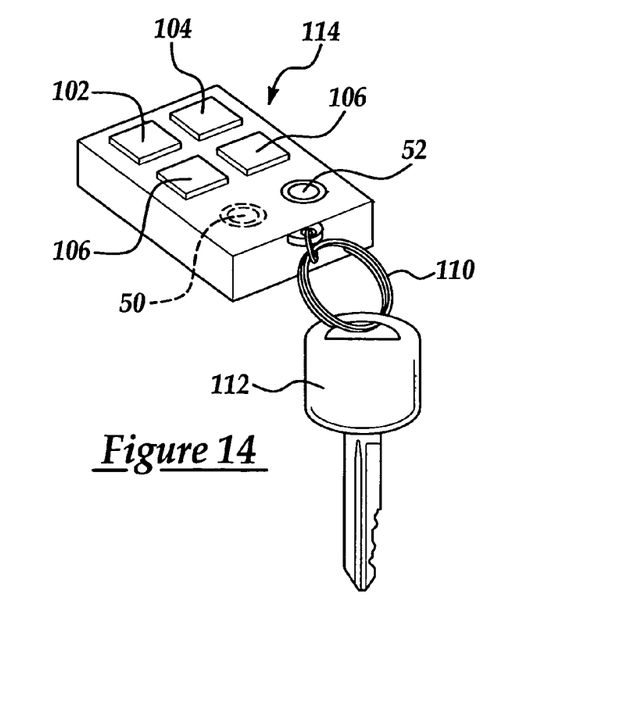
FIG. 14 illustrates a digital voice recorder integrated with a fob in accordance with a preferred embodiment of the present invention.

In several preferred embodiments, shown in FIGS. 5, 7, 8, 12, and 14 the electronic device 36 has a speaker 52, and a microphone 50 for communicating with another person or alternatively, for communicating with another electronic device. The electronic device 36 may be a personal digital assistant (PDA) 74 as shown in FIG. 5; a cellular phone 44 as shown in FIG. 7; a two-way radio 76 as shown in FIG. 12; a wristwatch 46 as shown in FIG. 8; a voice recorder 114 as shown in FIG. 14; or a multi-communication signal fob repeater 54 as shown in FIG. 9. It is contemplated that the fob 100 be combined with one or more features of the PDA 74, cell phone 44, the two-way radio 76, the wristwatch 46, the voice recorder 114, the audio player, the video player, the timer having an alarm, the compass, and the multi-communication signal fob repeater 54 into a single multi-functional electronic device 36.

The electronic device 36 provides both hardware and software to facilitate bi-directional communications with a fob-activated device via a direct signal, or alternatively, via a signal transmitted to or from the electronic device via a single signal repeater or a multi-communication signal repeater.

Additionally, an optional display 38 is provided as shown in several preferred embodiments, shown in FIGS. 5, 7, and 8.

In one embodiment, the optional display 38 may incorporate a graphical user interface (GUI) having soft buttons 68 that when touched or contacted may be used to selectively display data stored within a storage unit such as memory cells disposed within the electronic device 36 to a user of the electronic device 36. Alternatively, the display 38 may be in the form of an electrochemical or an electronic display that is well known in the electrical display arts such as a plasma, an LED, or a liquid crystal display (LCD).

Preferably, the data stored within a storage unit disposed within the electronic device 36 may be selectively displayed by using at least one of an optional multi-function joystick 58, hardware buttons 70,72, or the soft GUI buttons 68 located on the electronic device 36. For example, data such as a vehicle's owner's manual may be selectively displayed by a user of the electronic device 36. At least one of the optional buttons 70,72, multi-function joystick 58, or soft GUI buttons 68 may operate to selectively scroll through an overview of the owner's manual, or alternatively, may be used to access only the most frequently referenced items or contents of the owner's manual. Selected portions of the owner's manual may be output to the display 38 user by use of at least one of or a combination of text, video images, and audio text support.

Figure 11:
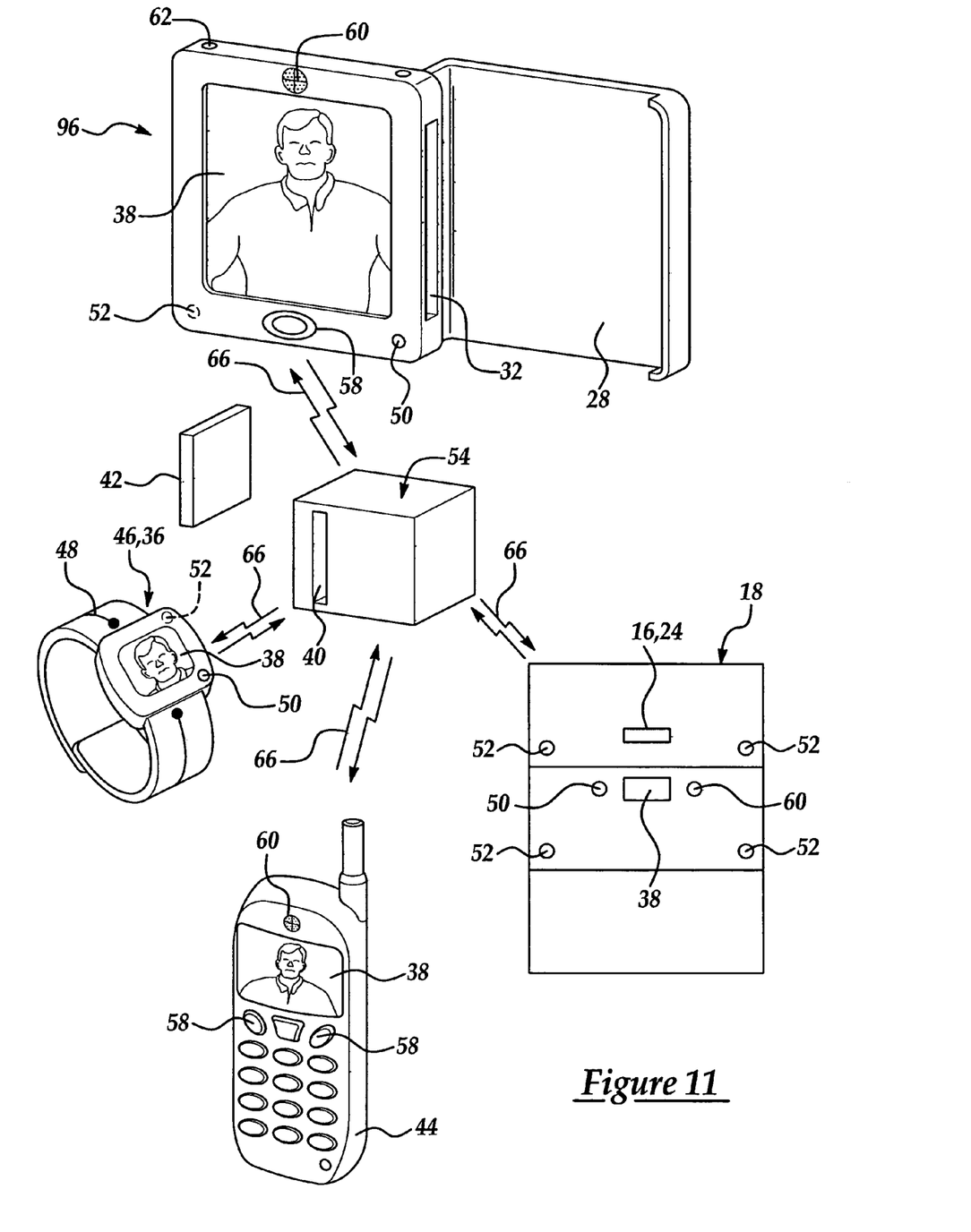
FIG. 11 illustrates a fob communication system having a plurality of electronic devices including a PDA equipped with a camera, a fob wristwatch, a multi-communication fob repeater, and a cell phone in communication with a transceiver.

Additionally, in an alternative embodiment, the display 38 may capture digital or analog images, illustrated as an image of a man shown on the displays of devices 96, 46, and 44 in FIG. 11, from an optional digital camera or analog real-time video camera 60 that is incorporated into or is in electrical communication with the electrical device 36. The camera 60 may be used for example, for showing the location of a vehicle that is associated with the fob chip 42 by photographing the area around where the vehicle is parked.

The optional camera 60 is shown in three alternative embodiments in FIGS. 5, 7, 8, and 11 wherein FIG. 5 illustrates the camera 60 located on the PDA 74, FIG. 7 illustrates the camera 60 located on the cell phone 44, FIG. 8 illustrates the camera 60 located on the wristwatch 46; and FIG. 11 illustrates use of all three devices 74, 44, and 46.

FIG. 5 illustrates the electronic device 36 as being a personal digital assistant (PDA), wherein the PDA 74 preferably has an associated operating system and microprocessor (not shown). The PDA 74 also preferably has at least one speaker 52 for communication of received audio signals and a microphone 50 for communicating with another person or for storing an audio signal communication within the PDA.

Additionally, as shown in FIG. 5, an optional stylus antenna 62 may be provided to operate in a dual capacity, as both a conventional stylus as is well known in the PDA arts, and as an antenna that is embedded within the stylus. The antenna portion of the stylus operates best when stowed within the PDA 74 to directionally find the vehicle using received signal strength, and to improve communication range with other devices, such as a vehicle or with a repeater.

FIG. 7 illustrates an embodiment of a fob chip 42 incorporated into a cellular phone 44, wherein the cellular phone is equipped with an optional cellular phone fob docking port 40 for linking with a removable fob chip 40. The cellular phone 44 also preferably has a speaker 52 for communication of received audio signals and a microphone 50 for communicating with another person.

FIG. 12 illustrates an embodiment of a fob chip 42 or fob 100 incorporated into a two-way radio 76. The two-way radio 76 preferably has a speaker 52 for communication of received audio signals and a microphone 50 for communicating with another person.

FIG. 8 illustrate a wristwatch fob 46. The functions of fob 100 may be integrated into a wristwatch fob 46 such that the fob does not need to be carried separately in a pocket or purse.

The wristwatch fob 46 may be equipped with an LCD display 38 for showing the location of a vehicle. The wristwatch fob 46 may further have a microphone 50 and a speaker 52 for 2-way communication with occupants of vehicle. In a preferred embodiment, the wristwatch fob 46 has an antenna 48 integrated into the wristband that can be used to directionally find the vehicle using received signal strength, and to improve communication range with other devices, a vehicle or a repeater.

In an alternative embodiment, the wristwatch fob 46 may incorporate at least one of the features selected from a cellular phone, a PDA, and a two-way radio to communicate with another person or electronic device 36. For example, bi-directional communication between the wristwatch fob 46 and another electronic device would assist in the location of child wearing the wristwatch fob 46 in the event that the child becomes separated from the child's parents in a store. Also, the features of a voice recorder may be integrated into the wristwatch fob 46.

FIG. 14 illustrates a fob chip 42 or fob 100 integrated into a voice recorder fob 114. Preferably, as shown in FIG. 14, the digital voice recorder is releasably engagable with a key ring 110 for retaining an ignition key 112. Also preferably, the voice recorder is a digital voice recorder having a record button 102 capable of recording audio signals and a play button 104 capable of repeating stored digitized audio signals. Additionally, the voice recorder fob 114 also preferably has at least one speaker 52 for communication of received audio signals and a microphone 50 for communicating with another person. The voice recorder features can be beneficially used to record user messages such as a message that notes the location of a vehicle parked in a large parking lot. It is contemplated that conventional fob buttons 106 may be incorporated into the voice recorder fob 114 to provide selective access to portions of a vehicle. It is further contemplated that the features of the voice recorder fob 114 be integrated with features from the other electronic devices 36 disclosed herein.

Optionally, text, video images, and audio text support are provided to a user through use of an audio or video player and can be displayed on the display 38, as shown in FIG. 7.

Preferably, the audio player is capable of recording, storing, and playing digital music files such as MP3 files. Preferably, the electronic device comprises a combination audio player and video player, wherein the combination audio player and video player cooperate to provide video images, text, and audio text support to a user. Also, the video or audio player may be integrated with another electronic device, such as a PDA.

In an alternative embodiment, shown in FIGS. 9 and 11, the multi-communication signal fob repeater 54 is provided with a docking port 40, and an optional rechargeable interface 94 for recharging a fob chip 42. The multi-communication signal fob repeater 54 communicates fob chip signals to remote receivers or repeaters via communication links 66. Additionally, as shown in FIG. 11, links 66 provide communication between the multi-communication signal fob repeater 54 and the other electronic devices 44, 46, 74, 76, or between the multi-communication signal fob repeater 54 and at least one of the vehicle receiver 16, and the vehicle receiver repeater 24, wherein the communication is preferably bi-directional. Also, as shown in FIG. 9, a location of a multi-communication signal fob repeater 54 may be determined by a global positioning satellite (GPS) 54.

FIG. 1 illustrates a fob communication system 20 that provides for communication between the multi-functional fob 100, 42 and a fob-activated device 18. Preferably, as shown in FIG. 1, the fob-activated device 18 is a motor vehicle. The multi-functional fob 100, or alternatively, fob chip 42 disposed within an electronic device 36 in is communication with a fob communication receiver 16 via a communication means or link 12.

The vehicle 18 may optionally have a transmitting/receiving device, i.e. transceiver such as a cell phone, PDA, or a two-way radio that provides bi-directional communication with the fob 100 integrated within the electronic device 36.

The communication means 12 may operate to locate the absolute or relative position of the fob 100 with respect to a fob activated device 18. The communication means 12 may include blue tooth, RF, infrared, ultrasonic, GPS, cellular, radio, or other communication means that facilitates communication between a transmitter and a receiver.

Figure 2:
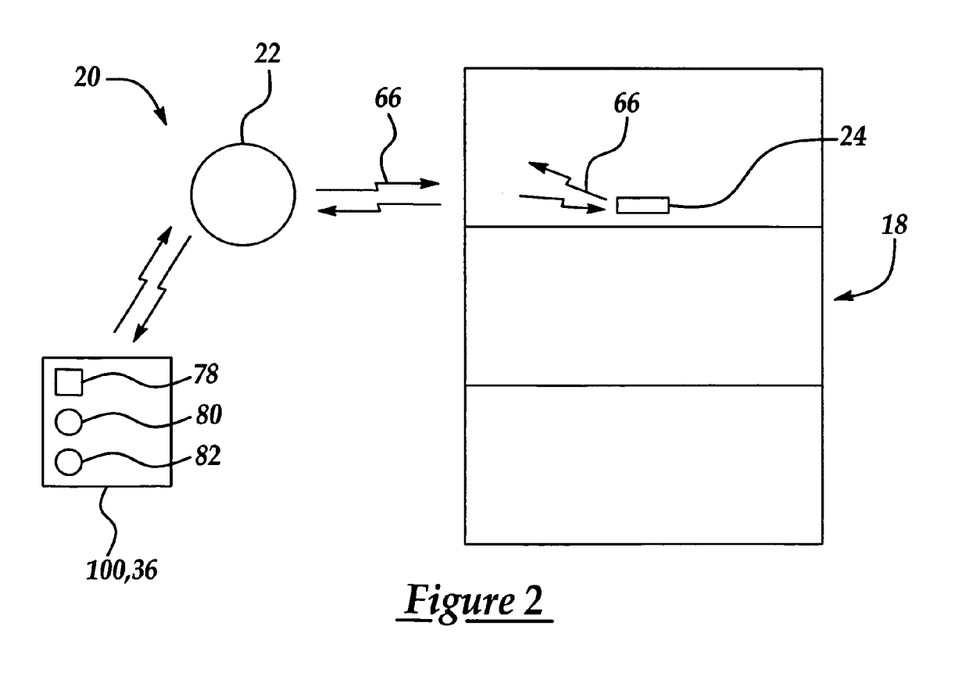
FIG. 2 illustrates a fob in communication with a multi-communication signal repeater that is in further communication with a communication receiver.

FIG. 2 illustrates an alternative fob communication system 20 that has at least one fob 100, or alternatively, at least one fob chip 42 disposed within an electronic device 36, a fob single signal repeater 22, wherein the fob single signal repeater 22 is in communication with a fob repeater receiver 24, and wherein the fob repeater receiver 24 is preferably disposed within the vehicle 18. The communication signals repeated by the fob single signal repeater 22 may include communication means 12 such as cellular means, blue tooth, RF, ultrasonic, infrared, satellite or other communication means that facilitates communication between a transmitter and a receiver.

FIG. 9 illustrates an alternative embodiment of the fob communication system 20, wherein the fob repeater is a multi-communication signal fob repeater 54 that may be used in combination with at least one of the electronic devices selected from the group of at least one PDA, at least one cell phone, at least one two-way radio, at least two wristwatch, at least one voice recorder, and at least one a vehicle. A multi-communication signal fob repeater 54 may optionally use a GPS satellite 56 to communicate a location of the vehicle 18 to at least one or a plurality of the electronic devices.

Figure 10:
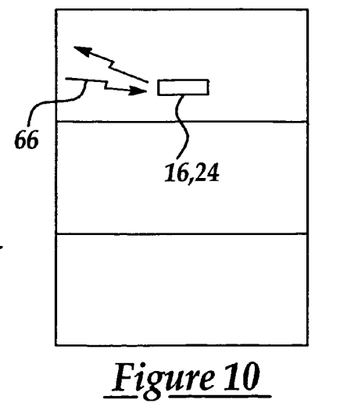
FIG. 10 illustrates an automobile in communication with multiple embodiments of a fob or fob repeater in accordance with a preferred embodiment of the present invention.

FIG. 10 illustrates a fob-activated device 18 having a receiver 16 or a repeater receiver 24 that is in communication with at least one fob or with a fob repeater via communication link 66.

FIG. 11 illustrates a fob communication system 20 that has a multi-communication fob repeater 54 in communication with the PDA 74 as shown in FIG. 5; a two-way radio 76 as shown in FIG. 12; a wristwatch 46 as shown in FIG. 8, a cell phone as shown in FIG. 7, and at least one of a receiver 16, and a receiver repeater 24 located within a fob-activated device 18. Additionally, as shown in FIG. 11, the fob-activated device is an automobile, as illustrated in FIG. 11 preferably has four speakers 54, a camera 60, a display 38 for bi-directionally communicating signals to remote electronic devices via the communication links 66.

It should be understood that the invention is not limited to the exact embodiment or construction which has been illustrated and described but that various changes may be made without departing from the spirit and the scope of the invention.

What is claimed is:

1. A multi-functional fob for use with a vehicle, the fob comprising:
   a user-defined programmable function;
   a voice-activated function for selectively activating at least one setting corresponding to at least one fob-activatable device in the vehicle;
   a confirmation function for confirming completion of activation or deactivation of said fob-activated device;
   a rechargeable interface;
   a camera configured to capture video images; and
   an audio player configured to record, store, and play audio files;
   wherein the multi-functional fob does not include a phone and includes a two-way radio operable for communicating with a person positioned external to the vehicle, said two-way radio having a speaker and a microphone for communicating with said person.

2. The multi-functional fob of claim 1, including a programmable credit card strip that is detachable from said fob and that is programmable with user-provided credit card information.

3. The multi-functional fob of claim 1, wherein the voice activated function uses voice-activation technology to remotely activate a fob-activated device upon receiving an audio signal from a user.

4. The multi-functional fob of claim 1, wherein said fob is integrated into a wristwatch.

5. The multi-functional fob of claim 1, wherein the confirmation function comprises at least one of: an audio signal; a vibrating signal; and a visual signal.

6. The multi-functional fob of claim 1, further comprising a fob-retaining device to releasably engage the multi-functional fob from a fob-retaining device.

7. The multi-functional fob of claim 1, wherein the fob-retaining device is a key ring.

8. The multi-functional fob of claim 1, further including an ice scraper having an edge capable of clearing away ice or snow.

9. The multi-functional fob of claim 8, wherein the ice-scraper of the multi-functional fob comprises a hinge attached to the fob.

10. The multi-functional fob of claim 1, further comprising: a rechargeable battery, wherein the rechargeable battery can be recharged via the rechargeable interface.

11. The multi-functional fob of claim 10, wherein the rechargeable interface recharges the rechargeable battery using at least one of the currents selected from the group of an AC, a DC, and an inductive current.

12. The multi-functional fob of claim 11, wherein the rechargeable interface of the multi-functional fob comprises a hardwired electrical connection to an ignition key adapted to turn an ignition, wherein the ignition key has a positive terminal and a negative terminal for communicating electrical current to the fob for charging the fob when the ignition key is turned in the ignition.

13. The multi-functional fob of claim 11, wherein the rechargeable interface of the fob comprises an inductive auxiliary charger located on a steering column of a vehicle.

14. The multi-functional fob of claim 11, wherein the rechargeable interface of the fob comprises a key ring inductive charger integrally formed with an ignition key, wherein the key ring inductive charger is adapted to inductively couple with the multi-functional fob.

15. The multi-functional fob of claim 1, wherein the rechargeable interface of the fob comprises: a USB drive in communication with a USB port.

16. The multi-functional fob of claim 1, wherein the fob further comprises a biometric user identification function adapted to use biometric data to differentiate between different users of the multi-function fob.

17. The multi-functional fob of claim 1, wherein said wristwatch includes an antenna for directionally locating the vehicle.

18. A multi-functional fob comprising: a fob chip; a display; a camera selected from at least one of a digital camera for capturing digital images and an analog real-time video camera for capturing a stream of images that are displayable on the display; and an electronic device comprising at least one of a PDA, a two-way radio, a wristwatch, a voice recorder, an audio player, a video player, and a multi-communication fob repeater; wherein the multi-functional fob chip is integrated with the electronic device; and wherein the multi-functional fob does not include a phone.

19. The multi-functional fob of claim 18, wherein the multi-functional fob chip is integrally formed with the electronic device via hard wiring or software.

20. The multi-functional fob of claim 18, wherein the electronic device further comprises:
a docking port capable of bi-directionally electrically communicating with the fob chip.

21. The multi-functional fob of claim 20, wherein the fob chip is in bi-directional electrical communication with the electronic device via the docking port when releasably engaging the docking port.

22. The multi-functional fob of claim 20, wherein the docking port is a USB port in communication with a USB drive.

23. The multifunctional fob of claim 18, wherein the electronic device comprises: a speaker; and a microphone for communicating with another with another electronic device.

24. The multi-functional fob of claim 18, wherein the electronic device comprises: a display comprising at least one of a touch screen display, a plasma display, an LED display and a liquid crystal display, wherein a plurality of data stored within the electronic device may be selectively displayed on the display using at least one of the group selected from a multi-function joystick, at least one hardware button, and at least one soft GUI button.

25. The multifunctional fob of claim 18 wherein the voice recorder comprises: a digital voice recorder having a record button capable of digitizing and recording audio signals, and a play button capable of playing recorded digitized audio signals.

26. The multifunctional fob of claim 18, wherein the electronic device comprises at least one of: an audio player; and a video player.

27. The multifunctional fob of claim 26 wherein the audio player is a music player capable of recording, storing, and playing MP3 files.

28. The multifunctional fob of claim 18, wherein the electronic device comprises a combination audio player and video player, wherein the combination audio player and video player cooperate to provide video images, text, and audio text support to a user.

29. The multifunctional fob of claim 18, wherein the electronic device further comprises a timer.

30. The multifunctional fob of claim 18, wherein the electronic device further comprises a compass.

31. A multifunctional fob communication system for use with a vehicle, the system comprising:
a multi-functional fob comprising: a user-defined programmable function, a voice-activated function, and a rechargeable interface;
a display;
an electronic device selected from the group consisting of a PDA, a two-way radio, a wristwatch, and a voice recorder, wherein the multi-functional fob is integrated with the electronic device;
a fob transmitter, wherein the fob transmitter is integrally formed within at least one of the multi-functional fob and the electronic device for transmitting signals to a fob receiver;
a fob receiver located within a fob-activated device capable of receiving signals from the transmitter;
at least one communication link to facilitate communication between the fob transmitter and the fob receiver; wherein said multi-functional fob is integrated into a wristwatch; and
a biometric user identification function adapted to use biometric data to differentiate between different users of the multi-function fob.

32. The multi-functional fob communication system of claim 31, wherein the communication between the fob transmitter and receiver is bi-directional and includes a two-way radio operable for communicating with a person positioned external to the vehicle, said two-way radio having a speaker and a microphone for communicating with said person.

33. The multi-functional fob communication system of claim 31 further comprising: at least one repeater capable of repeating a signal transmitted from the fob transmitter to the fob receiver, wherein the repeater is selected from a group consisting essentially of a single signal fob repeater and a multi-communication signal fob repeater, and wherein the multi-functional fob communication system facilitates bi-directional communication between the with the multiple-function fob integrated the electronic device and the receiver located within the fob-activated device.

34. The multi-functional fob communication system of claim 31, wherein the fob-activated device is a motor vehicle, and wherein said wristwatch includes an antenna adapted to receive a signal from said motor vehicle for directionally finding said motor vehicle based on the strength of said signal.

* * * * *